(12) United States Patent
Muraki et al.

(10) Patent No.: US 8,087,852 B2
(45) Date of Patent: Jan. 3, 2012

(54) DIAMOND CUTTING MEMBER AND METHOD OF MAKING THE SAME

(75) Inventors: Harukazu Muraki, Okaya (JP); Youichiro Shimoda, Toyokawa (JP)

(73) Assignees: OSG Corporation, Toyokawa-shi (JP); Nissin Diamond Tool Mfg. Co., Ltd., Takashima-shi (JP)

( * ) Notice: Subject to any disclaimer, the term of this patent is extended or adjusted under 35 U.S.C. 154(b) by 539 days.

(21) Appl. No.: 12/227,851

(22) PCT Filed: Oct. 5, 2007

(86) PCT No.: PCT/JP2007/069627
§ 371 (c)(1),
(2), (4) Date: Dec. 1, 2008

(87) PCT Pub. No.: WO2009/044488
PCT Pub. Date: Apr. 9, 2009

(65) Prior Publication Data
US 2010/0003091 A1    Jan. 7, 2010

(51) Int. Cl.
*B23B 29/12* (2006.01)
*B23B 27/18* (2006.01)
*B23P 15/30* (2006.01)
(52) U.S. Cl. .............. 407/101; 407/66; 407/113
(58) Field of Classification Search .......... 407/101, 407/102, 99, 66, 113–115, 120
See application file for complete search history.

(56) References Cited

U.S. PATENT DOCUMENTS

| | | | | |
|---|---|---|---|---|
| 3,653,107 A * | 4/1972 | Hertel | | 407/86 |
| 6,540,450 B2 * | 4/2003 | Gatton et al. | | 407/113 |
| 7,017,246 B2 * | 3/2006 | Suzuki | | 29/50 |
| 7,390,148 B2 * | 6/2008 | Krenzer et al. | | 407/30 |
| 7,520,701 B2 * | 4/2009 | Kukino | | 407/119 |
| 2008/0025802 A1 * | 1/2008 | Kukino | | 407/42 |

FOREIGN PATENT DOCUMENTS

| | | |
|---|---|---|
| JP | A-60-016306 | 1/1985 |
| JP | A-61-136702 | 6/1986 |
| JP | A-02-145201 | 6/1990 |
| JP | A-03-149106 | 6/1991 |
| JP | A-03-208505 | 9/1991 |
| JP | A-06-126512 | 5/1994 |
| JP | A-2000-107912 | 4/2000 |
| JP | A-2002-254212 | 9/2002 |

* cited by examiner

*Primary Examiner* — Boyer D Ashley
*Assistant Examiner* — Sara Addisu
(74) *Attorney, Agent, or Firm* — Oliff & Berridge, PLC

(57) ABSTRACT

A shank has a mount reference surface formed with a mount seat having a mount seat surface inclined at a given inclined angle α. A diamond raw material is held on the shank in an attitude such that a first bottom surface thereof is in tight contact with the mount seat surface, and a first apex is protruded forward nearly along a centerline of the shank. A portion of the first apex, protruding from the mount reference surface, is ground and removed as a given inclined angle θ. This causes a surface or its vicinity (in a value less thank approximately ±1°) to be formed as a raked face. The first bottom surface of the diamond raw material is held intact in tight contact with the mount seat surface to be integrally bonded thereto by active metal brazing, easily ensuring an increased bonding surface area to easily obtain increased bonding strength. This results in a further remarkable reduction in manufacturing time and manufacturing cost as those achieved in a case where a portion of a seconds apex opposite to the first apex formed with the raked face is grounded and removed to forma a bonding member.

5 Claims, 12 Drawing Sheets

FIG.1
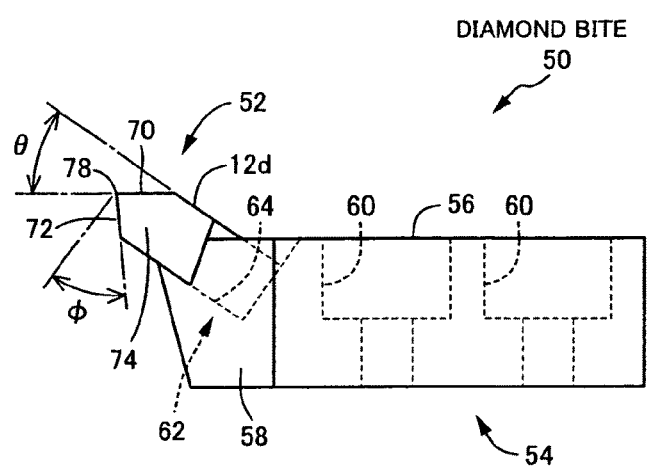
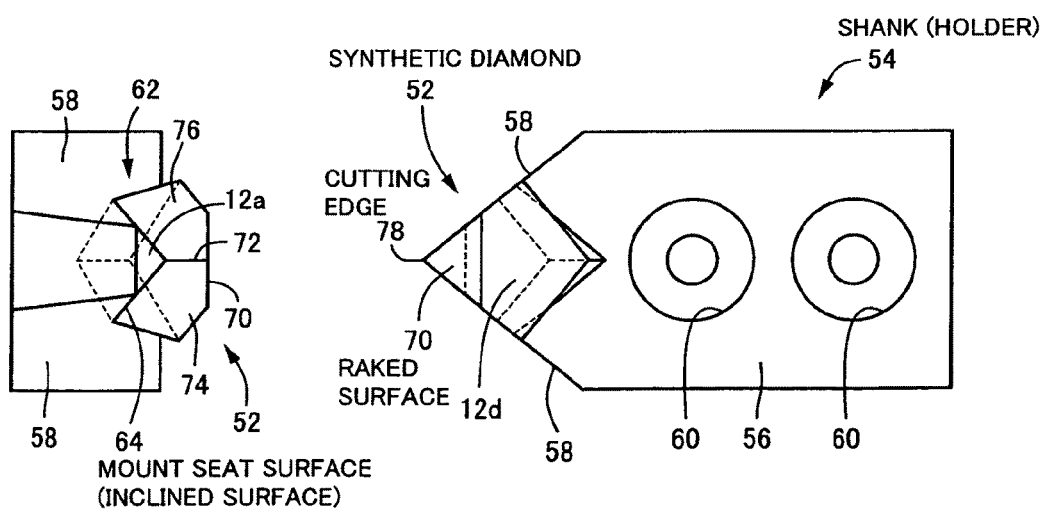

FIG.2
(a)
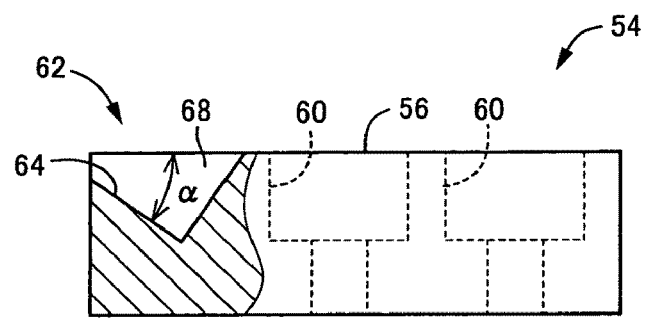
(c)
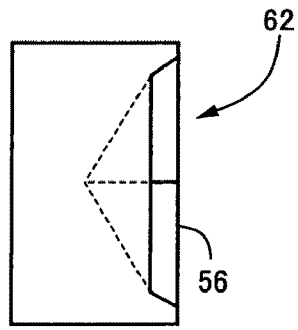
(b)
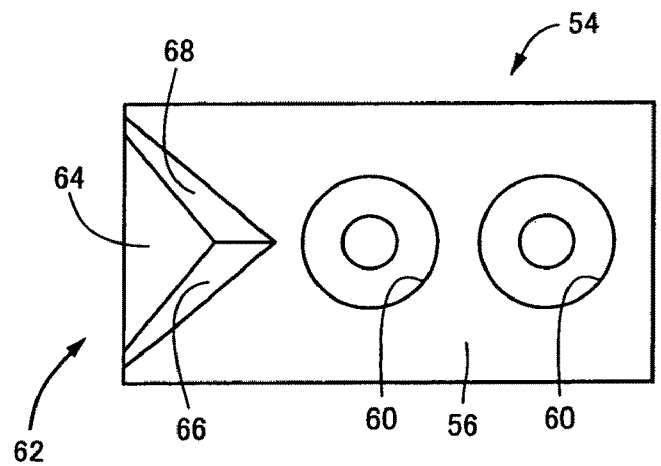

FIG.3
(a)
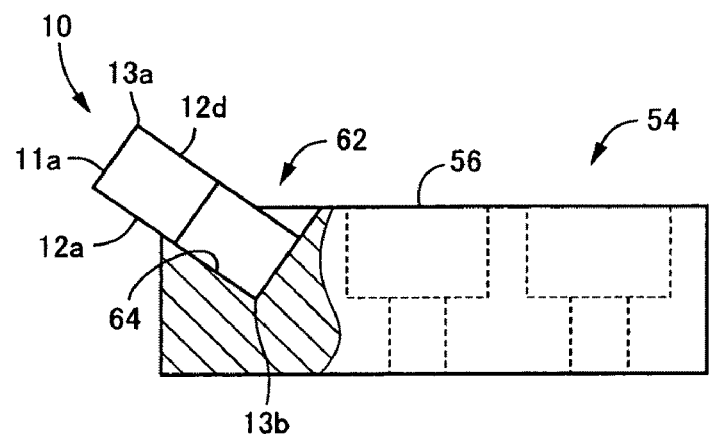
(c)
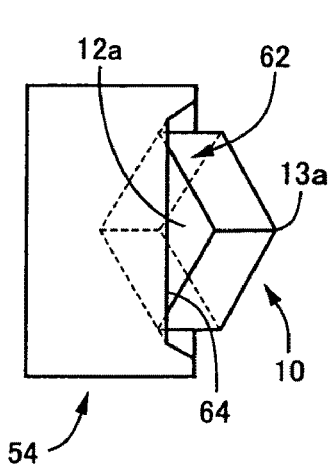
(b)
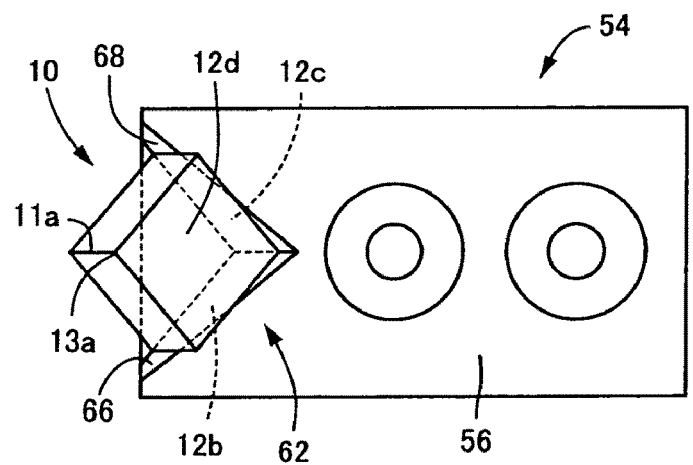

FIG.4
(a)
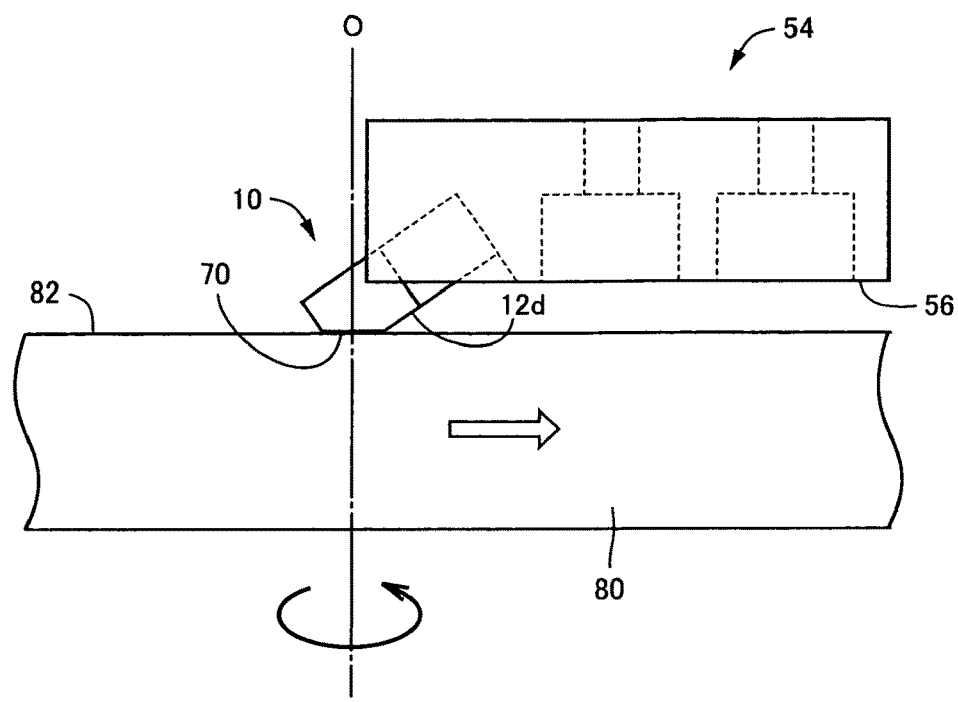
(c)                    (b)
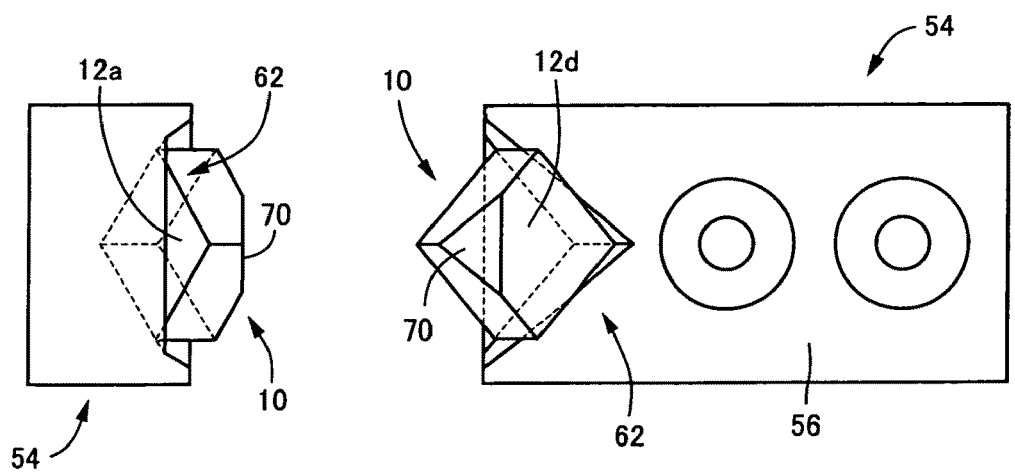

FIG.5
(a)
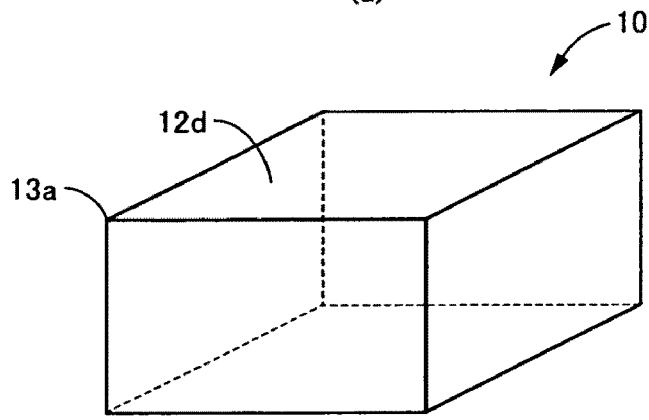
(b)
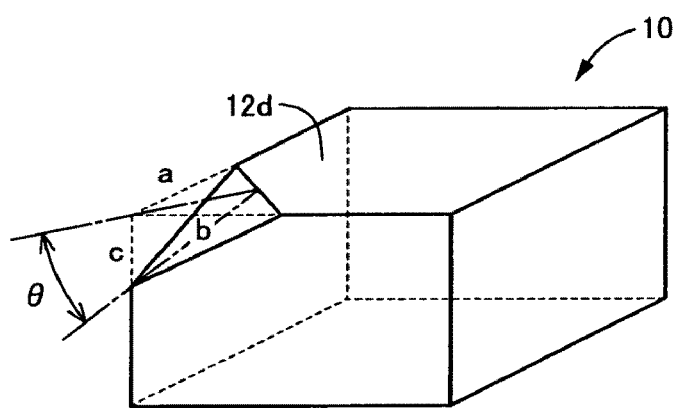
(c)
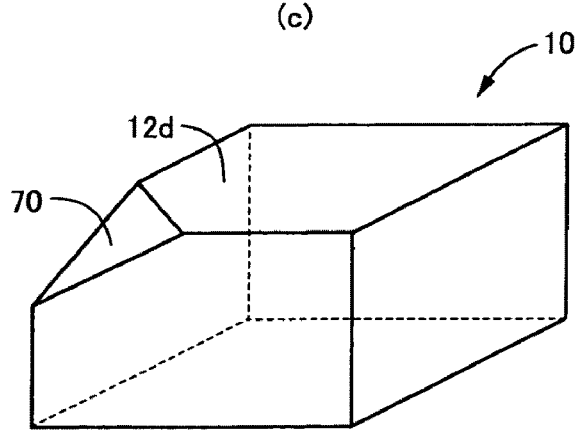

| | TOOL SHAPE | | CUTTING DISTANCE TO INITIAL WEAR |
|---|---|---|---|
| | RAKED FACE | FRONT CLEARANCE FACE | |
| INVENTED CUTTING TOOL | {112} | {111}-5° | 50km OR MORE |
| CONVENTIONAL CUTTING TOOL | {100} | {100}-5° | 10.2km |

FIG.10
(a)
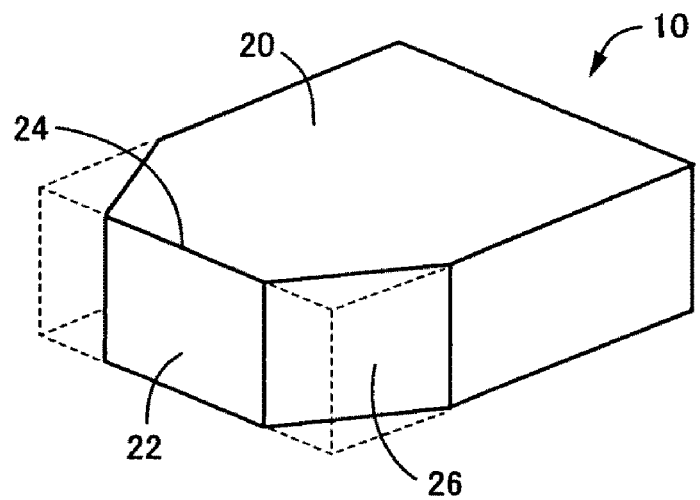
(b)
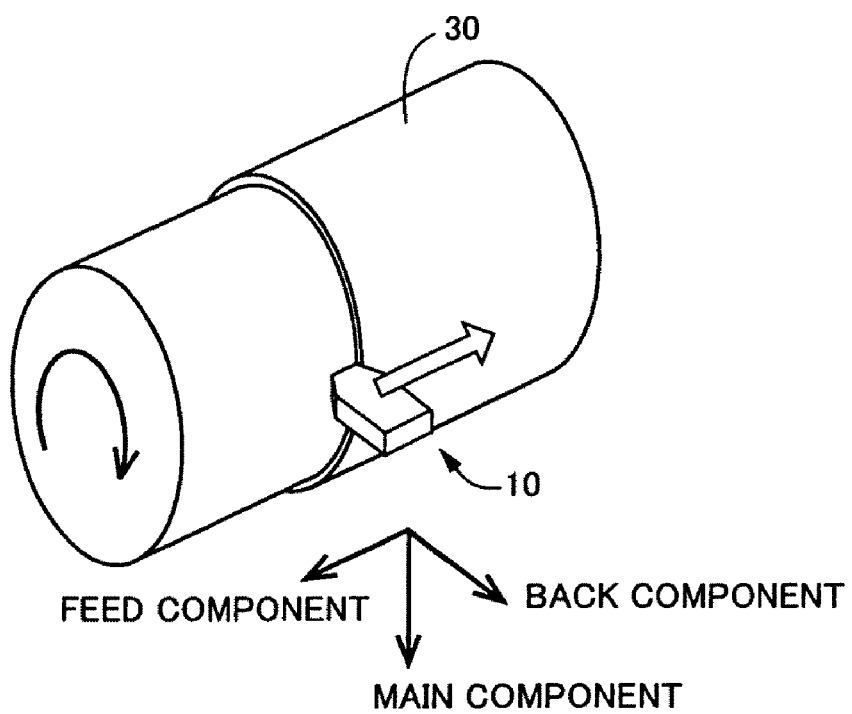

FIG.12
(a) {111} SURFACE
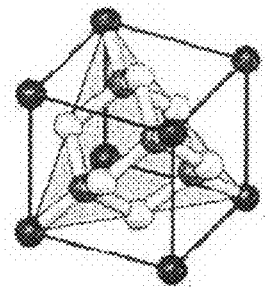
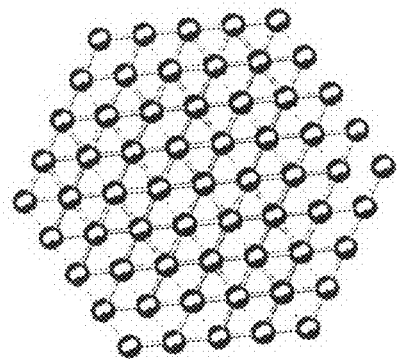
(b) {110} SURFACE
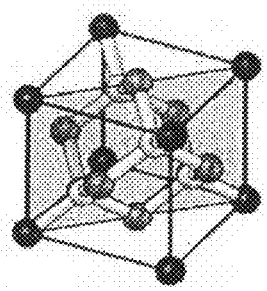
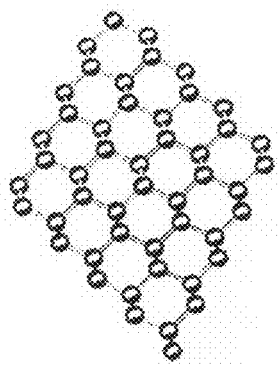
(c) {100} SURFACE
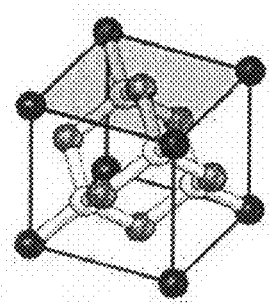
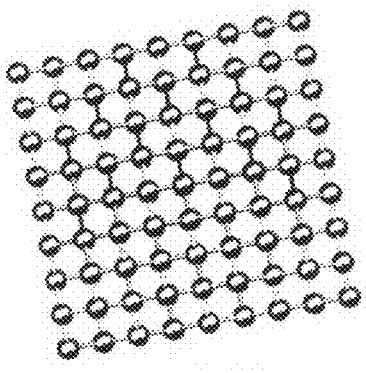

FIG.13
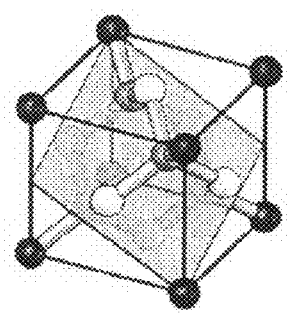
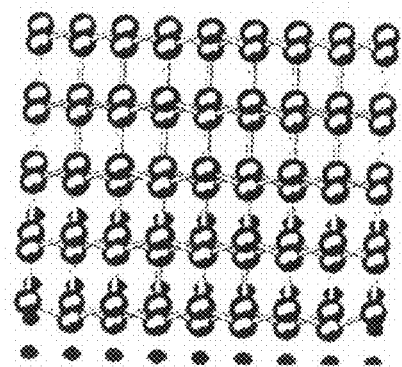

DIAMOND CUTTING MEMBER AND METHOD OF MAKING THE SAME

BACKGROUND OF THE INVENTION

1. Field of the Invention

This invention relates to diamond cutting members and, more particularly, to a technology of simply manufacturing a diamond cutting member at low cost utilizing a synthetic diamond whose surface {112} or its vicinity is used as a raked face.

2. Description of the Related Art

An attempt has heretofore been made to provide a diamond cutting member wherein a raw material such as a single-crystal diamond, formed with a cutting edge and a raked face, is integrally mounted on a given holder such as base metal, a shank or the like for use in cutting work. Patent Publications 1 and 2 disclose a diamond cutting tool and a diamond cutting chip, respectively, each representing such an example mentioned above, which have been suitably used for mirror-like finishing work on soft nonferrous metal such as aluminum and copper alloy or the like. For such diamond, it has heretofore been proposed to use synthetic diamonds (refer to Publications 3 and 4). In general, the synthetic diamond has less wear resistance than that of a natural diamond but less variation occurs in individual synthetic diamonds with stable quality (wear resistant performance).

The synthetic diamond has hexahedral shapes which basically has six surfaces {100}, i.e., a cubic or a rectangular solid with adjacent surfaces extending on planes perpendicular to each other. FIGS. 9(a) and 9(b) show such synthetic diamond. FIG. 9(a) shows the synthetic diamond 10, taking the form of a simple rectangular solid, which has six flat surfaces 12 expressed as surfaces {100}. The synthetic diamond 14, shown in FIG. 9(b), takes the form of a shape having chamfered flat surfaces 16 formed on corners of the synthetic diamond 10. The chamfered flat surfaces 16 occur due to a condition under which the synthetic diamond 14 is manufactured. In the present specification, the synthetic diamond 10 will be described as involving the synthetic diamond 14 having such chamfered flat surfaces 16.

Further, a symbol "{. . . }", described above, is a mirror index representing a crystal surface whose atoms are arrayed in a fixed arrangement. In case of diamond, as shown in FIG. 12, besides the surface {100}, a surface {111} and a surface {110} have been generally known. The natural diamond often has a basic configuration in the form of octahedral body or a dodecahedron. The octahedral body includes all surfaces formed of the surfaces {111}, and the dodecahedron includes all surfaces formed of the surfaces {110}. In FIGS. 12(a) to 12(c), all of views on a left side represent solid models illustrating crystal surfaces, and views on a right side show arrangements of the atoms on each crystal surface.

If the synthetic diamond 10 is used as a cutting member, processing the synthetic diamond 10 is difficult. With this in mind, as shown in FIG. 10(a), for instance, one of the surfaces {100} is used intact as a raked face 20 and the synthetic diamond 10 has a front distal end formed with a front clearance face 22 with a ridgeline serving as a cutting edge 24 at which the raked face 20 and the front clearance face 22 intersect each other. As shown in FIG. 10(b), for instance, the cutting edge 24 is used for achieving turning machining or the like to perform cutting work on an outer circumferential surface of a columnar workpiece 30 during a rotation thereof about an axis. This is accomplished by causing both component members to axially move relative to each other with the cutting edge 24 being pressed against the outer circumferential surface of the workpiece 30.

Such synthetic diamond 10 is mounted on a shank (not shown) at a distal end thereof for use as a cutting tool which is axially fed relative to the workpiece 30 in a manner as shown by a whitened arrow in FIG. 10(b). In addition, the synthetic diamond 10 has lateral clearance faces 26 formed on both sides of the front clearance face 22 depending on need. Moreover, the front clearance face 22 is preferably ground for removal to be slanted at a given clearance angle.

In the meanwhile, the surface {100} has relatively dense atoms, enabling the raked face 20 and the front clearance face 22 to be obtained with excellent wear resistance. The cutting edge 24 is structured with the ridgeline of the single-crystal synthetic diamond 10. This ridgeline results from a surface indicated by a shaded area in FIG. 9(a), i.e., the surface {110} that is ultimately minimized and substantially has the same wear resistance as that of the surface {110}. Thus, the ridgeline, i.e., the cutting edge 24 can be regarded as the surface {110}. Accordingly, the synthetic diamond 10 can have excellent wear resistance against a back component force acting in a direction perpendicular to the cutting edge 24 and a main component force (see FIG. 10(b)), but is weak in a direction parallel to the cutting edge 24, i.e., against a load acting in a direction along a feed component force. When feeding the cutting edge 24 along an axial direction of the workpiece 30 to perform turning machining as shown in FIG. 10(b), adequate wear resistance cannot be obtained.

Meanwhile, an attempt has heretofore been made to provide a synthetic diamond having a surface, inclined from a surface {100} forming an outer circumferential side face of the synthetic diamond to a surface (111) at an inclined angle of approximately 35°16', i.e., a surface {112}, which is used as a raked face (see Patent Publication 5). The surface {112} is a crystal surface appearing in a position shown in FIG. 13 on a left side thereof and has an atomic arrangement shown on a right side of FIG. 13. This is geometrically obtained from a crystal structure of the diamond and its presence has been confirmed even on an X-ray analysis and Nomarski analysis. The surface {112} has hardness next to that of the surface {111}, and excellent wear resistance in a combined effect of the surface {111} or its vicinity being formed in the front clearance face.

Patent Publication 1: Japanese Patent Application Publication 2-145201

Patent Publication 2: Japanese Patent Application Publication 2000-107912

Patent Publication 3: Japanese Patent Application Publication 60-16306

Patent Publication 4: Japanese Patent Application Publication 2002-254212

Patent Publication 5: Japanese Patent Application Publication 3-208505

DISCLOSURE OF INVENTION

Problem to be Solved by the Invention

FIG. 11 is a series of views showing one example of a manufacturing process, though not known yet, in which the surface {112} is used as a raked face. The synthetic diamond 10 has side faces 12d each formed with a surface {100}. An arbitrary apex 13a of any one of the side faces 12d is ground and removed by using a diamond grinding machine such as a skiving machine or the like. Grinding and removing are performed using the synthetic diamond 10 inclined from the side face 12d to the apex 13a at an inclined angle θ of approximately 35°16'. This results in the formation of the surface {112} or its vicinity as the raked face 32 (see FIGS. 11(a) and 11(b)).

Further, the synthetic diamond 10 has a distal end, facing at a front of an inclining direction of the raked face 32, which is similarly ground and removed using the skiving machine or the like to form a cutting edge 36. Thereafter, a lateral clearance face or the like is formed depending on need. A bonding surface 38 is then formed in a position opposite to the raked face 32 in nearly parallel thereto and unitarily bonded to a mount reference surface 42 of a holder 40 such as the shank or the like. This result in production of the desired diamond cutting member 44 such as the diamond cutting tool or the like (see FIG. 11(d)). Here, figures in upper sides of FIGS. 11(a) to 11(d) are front views and figures in lower sides of FIGS. 11(a) to 11(d) are plan views (as viewed in directions perpendicular to the raked face 32 and the mount reference surface 42).

There has been known a bonding technology using active metal brazing as a method of bonding the synthetic diamond 10 directly onto the holder 40. However, a high surface accuracy needs to be taken for the purpose of obtaining adequate bonding strength in using active metal brazing and the bonding surface needs to be ground and removed by the same skiving machine or the like as that used for preparing the raked face 32 or the like in a high-accuracy grinding technology. In addition, for an increased bonding surface area to be obtained, the synthetic diamond 10 needs to be ground and removed at an increased grinding rate. As a result, a need to perform troublesome grinding work and take much time increases manufacturing cost.

Further, in achieving the bonding by active metal brazing, the synthetic diamond 10 was heated under deoxidized atmosphere to form (metalize) a film with active metal such as titanium (Ti) and chrome (Cr) or the like on a surface of the synthetic diamond 10. Then, the synthetic diamond 10 is directly bonded onto the holder 40, made of sintered hard alloy, by silver brazing containing silver and copper.

The present invention has been completed on the ground of the above views and has an object to manufacture a diamond cutting member with increased wear resistance at low cost by utilizing a synthetic diamond, obtained in stabilized quality, whose surface {112} or its vicinity is used as a raked face.

Means for Solving Problem

A first aspect relates to a method of manufacturing diamond cutting members of sixth to ninth aspects. The method of manufacturing a diamond cutting member, integrally mounted on a given holder for use in performing cutting work, which has a raw material made of a single crystal synthetic diamond with a hexahedral shape basically having six surfaces {100} and formed with a cutting edge and a raked face, comprises steps of (a) a holder preparing step of preparing a holder having an inclined surface inclined at a given inclined angle α with respect to a mount reference surface; (b) a mounting step of integrally mounting the synthetic diamond on the holder in an attitude such that a first side face forming one of the six surfaces {100} of the synthetic diamond is located on the inclined surface in tight contact therewith, four ridgelines surrounding the first side face are inclined at a given angle ranging from 40° to 50° with respect to the inclined surface, and a first apex of one of eight apexes of the hexahedral shape is protruded from the mount reference surface along an inclining direction of the inclined surface; and (c) a grinding step of grinding and removing a portion of the first apex of the synthetic diamond fixedly mounted on the holder to protrude from the mount reference surface, to form a raked face inclined from the surface {100} to a surface {111} at a given inclined angle θ, ranging from 30°16' to 40°16', in an orientation toward the first apex in the inclining direction of the inclined surface, and forming a cutting edge on a distal end of the raked face along an inclining direction thereof.

A second aspect is featured by that, in the method of manufacturing the diamond cutting member according to the first aspect, the mounting step integrally bonds the synthetic diamond on the inclined surface of the holder by active metal brazing.

A third aspect is featured by that, in the method of manufacturing the diamond cutting member according to the first of second aspect, (a) the grinding step grinds and removes the portion of the first apex, protruding from the mount reference surface of the synthetic diamond fixedly mounted on the holder, to be parallel to the mount reference surface: and (b) the inclined angle α of the inclined surface formed on the holder is equal to the inclined angle θ of the raked face.

A fourth aspect is featured by that, in the method of manufacturing the diamond cutting member according to any one of the first to third aspects, the mount reference surface of the holder has a concaved mount seat formed in a triangular pyramid shape to allow a second apex placed in a position diagonal to the first apex to be formed with the raked face to be fitted, whereby fitting the second apex to the mount seat allows the synthetic diamond to be positioned in a fixed attitude.

A fifth aspect is featured by that, in the method of manufacturing the diamond cutting member according to any one of the first to fourth aspects, (a) the holder is a shank; and (b) the diamond cutting member is a diamond cutting tool including the synthetic diamond integrally mounted on the shank at a distal end portion thereof.

A sixth aspect is a diamond cutting member formed by a raw material made of a single crystal synthetic diamond having a hexahedral shape which basically has six surfaces {100} and is formed with a cutting edge and a raked face, the diamond cutting member being integrally mounted on a given holder for use in performing cutting work, wherein (a) the holder has an inclined surface inclined at a given inclined angle α with respect to a mount reference surface; (b) the synthetic diamond is integrally mounted on the holder in an attitude such that a first side face forming one of the six surfaces {100} of the synthetic diamond is located on the inclined surface in tight contact therewith, four ridgelines surrounding the first side face are inclined at a given angle ranging from 40° to 50° with respect to the inclined surface; and (c) a first apex of one of eight apexes of the hexahedral shape is protruded from the mount reference surface along the inclining direction; and the first apex of the synthetic diamond has a portion formed with a raked face, inclining from the surface {100} to a surface {111} at a given inclined angle θ ranging from 35°16'−5° to 35°16'+5° in an orientation toward the first apex along the inclining direction of the inclined surface, the distal end being formed with a cutting edge extending along an inclining direction of the raked face.

A seventh aspect is featured by that, in the diamond cutting member according to sixth aspect, the synthetic diamond is integrally bonded to an inclined surface of the holder by active metal brazing.

A eighth aspect is featured by that, in the diamond cutting member according to sixth or seventh aspect, the inclined angle α of the inclined surface formed on the holder is equal to the inclined angle θ of the raked face which is parallel to the mount reference surface of the holder.

A ninth aspect is featured by that, in the diamond cutting member according to any one of sixth to eighth aspects, (a) the holder is a shank; and (b) the diamond cutting member is a diamond cutting tool including the synthetic diamond integrally mounted on the shank at a distal end portion thereof.

ADVANTAGEOUS EFFECTS OF THE INVENTION

With the method of manufacturing a diamond cutting member according to one aspect of the present invention, the holder has the inclined surface inclined at the given inclined angle α with respect to the mount reference surface. The synthetic diamond has the six surfaces {100} any one of which forms the first side face that is located on the inclined surface in tight contact therewith. The synthetic diamond is integrally mounted on the inclined surface in the attitude inclined at approximately 45° (ranging from 40° to 50°) with respect to the inclining direction of the inclined surface. Grinding and removing the first apex portion, protruding from the mount reference surface, at the given inclined angle θ, causes the surface {112} or its vicinity (in a value less than approximately ±5°) to form the raked face.

In such a case, the first side face, forming one of the six surfaces {100} of the synthetic diamond, is held intact on the inclined surface in tight contact therewith to be integrally mounted thereon. Therefore, this easily ensures an increased bonding surface area, thereby easily obtaining increased mounting strength even when bonded by brazing or the like. This results in a further remarkable reduction in manufacturing time and manufacturing cost, compared with those achieved when forming a bonding contact surface by grinding and removing the second apex portion placed in a position opposite to the first apex on which the rake face is formed.

Accordingly, with such a manufacturing method, like the sixth to ninth aspects of the present invention, the surface inclined from the surface {100} to the surface {111} at the given inclined angle θ, i.e. the surface {112} or its vicinity is formed as the rake face. Such a raked face results in a simple manufacturing of the diamond cutting member with increased wear resistance at low cost due to a combined effect of the surface {111}, perpendicular to the surface {112}, or its vicinity being formed as the front clearance face.

The second to fifth aspects of the present invention, depending on the first aspect of the present invention, have the same advantageous effects as those of the first aspect of the present invention. With the second aspect of the present invention, further, an increased bonding surface area can be easily ensured when integrally bonding the synthetic diamond onto the inclined surface of the holder by active metal brazing. Therefore, these components can be strongly bonded to each other with no need to perform troublesome grinding work. The seventh aspect of the present invention, related to the diamond cutting member, also has similar advantageous effects.

With the third aspect of the present invention, the inclined angle α of the inclined surface formed on the holder, is equal to the inclined angle θ of the raked face. It may suffice for grinding and removing the first apex portion, protruding from the mount reference surface of the synthetic diamond fixedly mounted on the holder, to be parallel to the mount reference surface. Therefore, the raked face can be simply ground with high precision.

With the fourth aspect of the present invention, the mount reference surface of the holder has the concaved mount seat formed in the triangular pyramid shape. The second apex is fitted to the mount seat to be positioned in the fixed attitude. Therefore, the synthetic diamond can be stably held on the mount seat in the fixed attitude with high precision, grinding the raked face composed of the surface {112} or its neighboring surface, with high precision. In addition, due to the presence of contact on three surfaces, an increased bonding surface area can be obtained. This result in a capability of bonding associated component parts with further increased bonding strength, enabling the synthetic diamond to be mounted with adequate strength even on a mount portion with a relatively small area.

BRIEF DESCRIPTION OF THE DRAWINGS

FIG. 1 is a series of views showing a diamond cutting tool of one embodiment according to the present invention. FIG. 1(a) is a front view; FIG. 1(b) is a plan view; and FIG. 1(c) is a left side view.

FIG. 2 is a series of views singly showing a shank of the diamond cutting tool shown in FIG. 1. FIG. 2(a) is a front view of the shank with a part thereof being cut away; FIG. 2(b) is a plan view; and FIG. 2(c) is a left side view of the shank shown in FIG. 2(b).

FIG. 3 is a series of views showing a status under which a synthetic diamond raw material is integrally mounted on the shank shown in FIG. 2. FIG. 3(a) is a front view showing a part of a distal end portion being cut away; FIG. 3(b) is a plan view; and FIG. 3(c) is a left side view.

FIG. 4 is a series of views illustrating a grinding process in which a grinding is carried out on the diamond raw material to form a raked face. FIG. 4(a) is a front view showing how grinding work is carried out; FIG. 4(b) is a plan view showing a state under which the raked face is formed; and FIG. 4(c) is a left side view.

FIG. 5 is a series of perspective views singly showing individual processes in which the raked face is formed on the diamond raw material by grinding work shown in FIG. 4.

FIG. 8(a) represents a holder preparing step and a mounting step; and FIG. 8(b) and FIG. 8(c) represent grinding steps.

FIG. 9(a) is a perspective view in case of a rectangular solid configuration, and FIG. 9(b) is a perspective view with chamfered flat surfaces being formed at corners of the rectangular solid configuration.

FIG. 10 is a series of views illustrating application patterns in which one of surfaces {100} of the synthetic diamond, shown in FIG. 9, is used intact as a raked face to perform cutting work. FIG. 10(a) is a perspective view of the synthetic diamond subjected to given grinding work, and FIG. 10(b) is a perspective view showing one example of the synthetic diamond being applied to turning machining.

FIG. 12 is a series of views illustrating three crystal surfaces {111}, {110} and {100} of the diamond. Figures on a left side represent solid models showing positions of the crystal surfaces, and Figures on a right side represent atomic arrangements of the crystal surfaces, respectively.

FIG. 13 is a view illustrating the crystal surface {112}. Figure on a left side represents a solid model showing a position of the crystal surface {112} and Figure on a right side represents an atomic arrangement of the crystal surface {112}.

DESCRIPTION OF REFERENCE NUMERALS

BEST MODE FOR CARRYING OUT THE INVENTION

Figure 9:
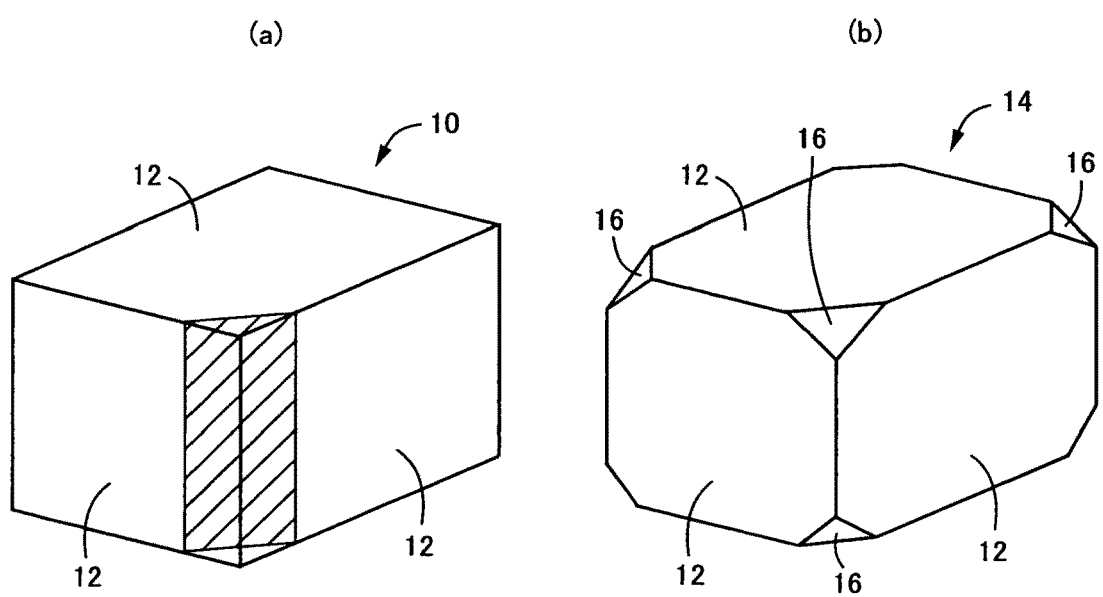
FIG. 9 is a series of views illustrating fundamental configurations of synthetic diamonds.
Figure 11:
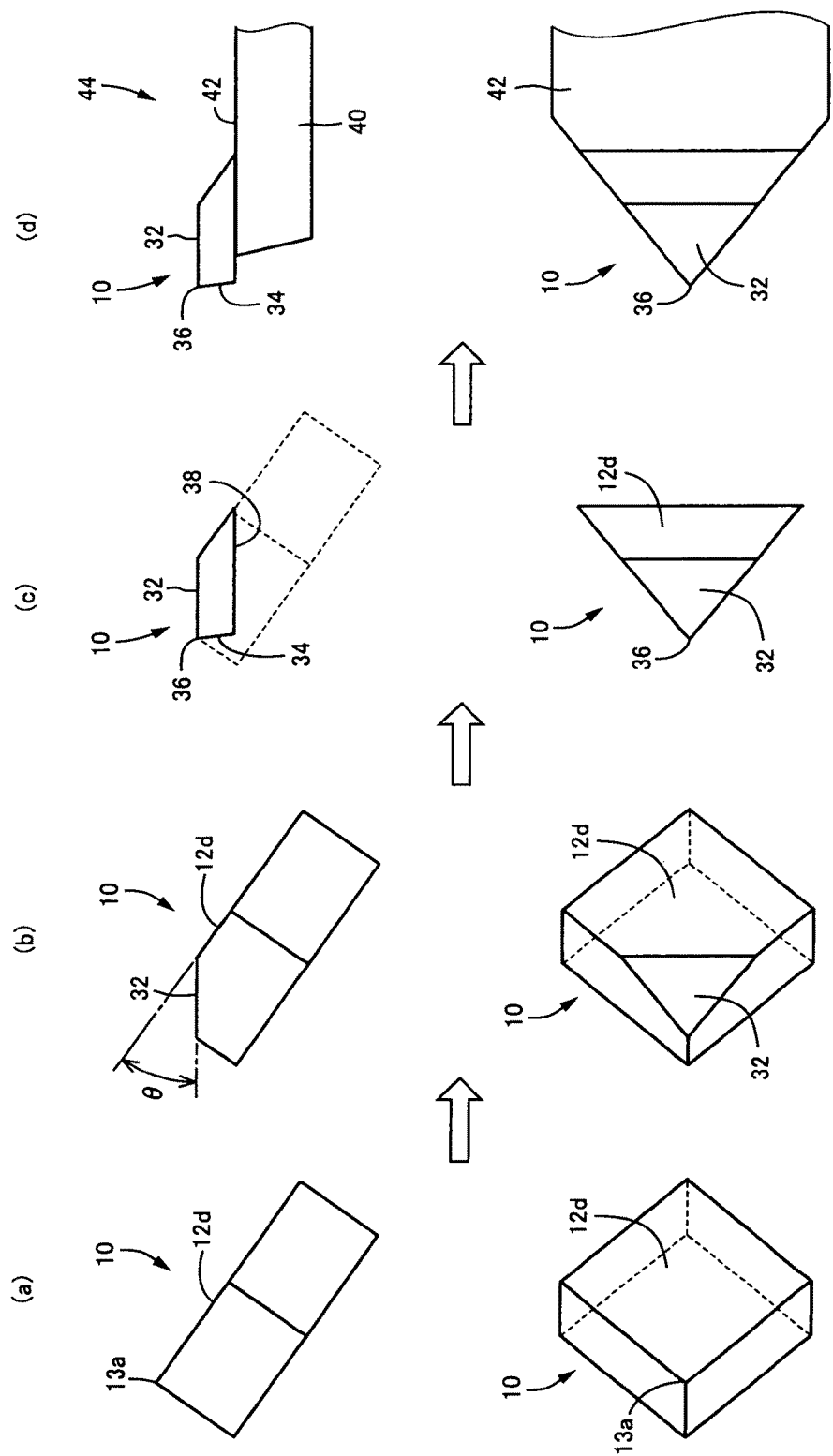
FIG. 11 is a series of views illustrating one example of a process of manufacturing a diamond cutting tool in a case where the synthetic diamond, shown in FIG. 9, is subjected to grinding work with a surface {112} being used as a raked face.

A diamond cutting member of the present invention includes a diamond cutting tool with a synthetic diamond directly mounted on a shank, and diamond chip which is bonded to a given base metal and is mounted on the other cutting tool in use. The synthetic diamond may include those, formed in a cubic body or a rectangular solid body as shown in FIG. 9(a), and those of the cubic body or the rectangular solid body with chamfered flat surface being formed at corner as shown in FIG. 9(b).

It is important to concern about various points discussed below in grinding and removing a first apex of the synthetic diamond to form a raked face made of a surface {112}. There is a need for the synthetic diamond to be fixedly mounted on an inclined surface of a holder in such an attitude described below. That is, as viewed on a plane perpendicular to the inclined surface of the holder, four ridgelines surrounding a first side face of the synthetic diamond are inclined at inclined angles of 45°, respectively, with respect to an inclining direction (normally in a fore and aft direction of a shank) of the inclined surface such that a first apex is caused to protrude in the inclining direction. However, if the inclined angle lies in a range of 45°±5°, i.e., in a value ranging from 40° to 50°, the synthetic diamond can have wear resistant performance nearly equal to that of the surface {112}. In addition, the inclined angle may preferably fall in a range of 45°±3° and more preferably in a range of 45°±1°.

Further, assuming that the inclined surface has an inclined angle α of 35°16', the four ridgelines surrounding the first side face as viewed on a plane perpendicular to the mount reference surface are inclined at an inclined angle of 50°45'. Under such a state, the attitude of the synthetic diamond can also be specified such that the inclined angle lies in a range of 50°45'±5° or ±3° or ±1°.

The same holds for an inclined angle θ with a portion of the first apex being removed. In forming the surface {112} as the raked face, a need arises for the relationship to be established as expressed as inclined angle θ=35°16' (35°15'52" strictly speaking). However, if the inclined angle θ lies in a range of 35°16'±5°, i.e., in a value ranging from 30°16' to 40°16', the synthetic diamond can have wear resistant performance nearly equal to that of the surface {112}. In addition, the inclined angle may preferably fall in a range of 35°16'±3° and more preferably in a range of 35°16'±1°.

While a sintered hard alloy is preferably used as a material of the holder, the other metallic material such as molybdenum or the like may be adopted. When bonding the synthetic diamond onto the holder by active metal brazing, the holder may be preferably made of a material with a thermal expansion coefficient nearly equal to that of the synthetic diamond. In this case, no flaking takes place due to a temperature variation after these two component parts are bonded to each other. In case of the holder made of the sintered hard alloy, the holder can be molded and sintered in a structure having an inclined surface and a concaved mount seat with a triangular pyramid configuration of a fourth aspect of the present invention.

However, the inclined surface or the mount seat may also be formed on a subsequent stage upon conducting grinding work or the like. In case of the mount seat formed in the concaved shape, a bottom portion of the mount seat may be formed with an escape hole or a distal end of a second apex of the synthetic diamond may be ground for removal. This is possible to avoid a surface contact from being blocked due to interference between the bottom portion of the mount seat and the second apex of the synthetic diamond.

For an expedient for the synthetic diamond to be fixedly mounted on the holder, active metal brazing may be preferably employed to directly bond the synthetic diamond on the holder. However, in implementing first and sixth aspects of the present invention, other bonding technique or mechanical fixing means can be adopted.

With a third aspect of the present invention, the relationship holds for the inclined angle α=θ and, in this case, the portion of the first apex of the synthetic diamond, protruding from a mount surface reference surface of the holder, may suffice to be ground for removal in parallel to the mount surface reference surface. However, no need necessarily arises for the relationship to hold as α=θ, and the grinding work is sufficiently performed on the raked face with the holder maintained in an inclined state, depending on needs to form the raked face at least the inclined angle θ.

Embodiment

Now, an embodiment of the present invention will be described below in detail with reference to the accompanying drawings.

FIG. 1 is a series of three views showing a diamond cutting tool 50 of one embodiment according to the present invention. FIG. 1(a) is a front view; FIG. 1(b) is a plan view; and FIG. 1(c) is a left side view, i.e., a view as viewed from a distal end of the diamond cutting tool 50.

The diamond cutting tool 50 is comprised of a shank 54 made of sintered hard alloy, and a synthetic diamond (ground product) 52. The synthetic diamond 52 is made from a synthetic diamond 10, formed in a rectangular solid configuration and ground in a given shape, which is integrally mounted on the shank 54 made of sintered hard alloy, at one end thereof. As solely shown in FIG. 2, the shank 54 has a nearly rectangular solid shape formed with two bolt holes 60 to be fixed to a tool holder of a lathe or the like by using bolts. As shown in FIG. 3, the shank 54 has a flat upper surface, i.e., a mount reference surface 56 having a distal end portion formed with a concaved mount seat 62. The mount seat 62 is formed in a triangular pyramid shape in conformity to one apex (second apex) 13b of the synthetic diamond (hereinafter referred to as "diamond raw material 10") before grinding work is conducted.

In the illustrated embodiment, grinding work is conducted on the diamond raw material 10 formed in a flat squared prism in cross section, with the diamond raw material 10 being integrally mounted on the shank 54. This result in the formation of the synthetic diamond 52 having a rake face 70 or the like. FIG. 2 and FIGS. 3(a) to 3(c) are views corresponding to FIGS. 1(a) to 1(c), respectively; FIG. 3(a) is a front view in which a distal end of the shank is partly cut out; FIG. 3(b) is a plan view; and FIG. 3(c) is a left side view of the shank shown in FIG. 3(b). In addition, the diamond cutting tool 50 corresponds to a claimed diamond cutting tool and the shank 54 corresponds to a claimed holder.

The mount seat 62 has a mount seat surface 64, with which one part (first bottom surface) 12a of a square-shaped bottom wall of the diamond raw material 10 formed in the flat square prism is held in tight contact, and a pair of wall surfaces 66 and 68 with which two side faces 12b and 12c adjacent to the first bottom wall 12a are held in tight contact. The mount seat surface 64 extends in a fore and aft direction of the shank 54, i.e., in a lateral direction as viewed in FIGS. 2(a) and 2(b), and is inclined at a given inclined angle α with respect to the mount reference surface 56. The pair of side faces 66 and 68 are formed in symmetric relation with respect to an inclining direction of the mount seat surface 64.

In mounting, a second apex 13b of the diamond raw material 10 is accommodated in the mount seat 62 with the first bottom surface 12a and the pair of side faces 12b and 12c held in tight contact with the mount seat surface 64 and the pair of wall surfaces 66 and 68 of the mount seat 62, respectively. With such placement, the first apex 13a, placed in a position diagonal to the second apex 13b, is positioned in a fixed attitude protruding nearly straight from the mount seat 62 along the inclining direction of the mount seat surface 64. Thus, as shown in FIG. 3(b) as viewed on a plane, the first apex 13a, placed in the diagonal position, is positioned in an attitude protruding in a forward direction nearly along a centerline of the shank 54. In the fixed attitude, in other words, the four ridgelines surrounding the first bottom surface 12a are placed in attitudes inclined at an angle of approximately 45° (ranging in a value of about ±1°) with respect to the inclining direction of the mount seat surface 64, respectively.

Although the mount seat 62 can be formed on a stage forming the shank 54 with sintered hard alloy, the mount seat 62 may be possible to be formed by grinding or the like after sintering step. Thus, the step of preparing the shank 54 having such a mount seat 52 corresponds to a claimed holder preparing step. The first bottom surface 12a corresponds to a claimed first side face representing either one of six surfaces {100} of the diamond raw material 10 and the mount seat surface 64 of the mount seat 62 corresponds to the claimed inclined surface.

The diamond raw material 10 is integrally mounted on the shank 54 at the distal end portion thereof with the first bottom wall 12a and the pair of side faces 12b and 12c being integrally bonded to the mount seat surface 64 and the pair of side faces 66 and 68 of the mount seat 62, respectively, by active metal brazing. Active metal brazing material is composed of silver alloy brazing material containing about 2 to 4% by weight of active metals such as, for instance, titanium (Ti) and chrome (Cr) and heated to a temperature of about 800° C. to 1000° C. under deoxidized atmosphere. Then, a film of active metal, such as titanium or chrome or the like, is formed (metalized) on the surfaces of the first bottom wall 12a and the pair of side faces 12b and 12c. Thus, the first bottom wall 12a and the pair of side faces 12b and 12c are directly bonded to the mount seat surface 64 of the mount seat 62 and the pair of wall surfaces 66 and 68.

Further, causing the three surfaces 12a to 12c perpendicular to each other to be completely brought into tight contact with the mount seat surface 64 and the wall surfaces 66 and 68 is difficult. Thus, it may suffice for at least the first bottom surface 12a to be surely brought into tight contact with the mount seat surface 64 to be integrally fixed thereto. Even with such placement, a relatively large contact surface area can be ensured in adequate bonding strength. Thus, the step of integrally bonding the diamond raw material 10 onto the mount seat 62 by active metal brazing corresponds to a claimed mounting step.

With the diamond raw material 10 fixedly mounted on the shank 54 in such a given attitude, grinding work is conducted on the diamond raw material 10 by using a diamond grinding technique with the use of a diamond grinding scaife or the like. This allows the synthetic diamond 52 to be obtained in a structure formed with the rake face 70 or the like. As shown in FIG. 4, during the grinding step, the shank 54 is placed upside down to be retained in parallel to a nearly horizontal grinding surface 82 of a diamond grinding wheel 80 drivably rotated about a centerline O such that the diamond raw material 10 is placed downward. Under such a retained state, the first apex 13a of the diamond raw material 10 is pressed against the grinding surface 82.

Thus, the first apex 13a is ground for removal in parallel to the mount reference surface 56 of the shank 54 to form the rake face 70 to be inclined at an inclined angle θ (see FIG. 1) with respect to a second bottom surface 12d placed in opposition to the first bottom surface 12a. With the grinding surface 82 and the mount reference surface 56 of the shank 54 extending parallel to each other, the inclined angle θ is equivalent to an inclined angle α of the diamond raw material 10 fixedly mounted on the mount seat surface 64 in tight contact therewith. The rake face 70 represents a surface inclined from surface {100} to surface {111} at the inclined angle θ.

The diamond raw material 10 of the present embodiment has the flat squared prism configuration. Therefore, in FIG. 4(b) as viewed on a plane, the first apex 13a, placed on a centerline of the shank 54, can be stabilized in attitude when pressed against the grinding surface 82 for grinding. FIG. 4(a) is a view showing the shank 54 retained upside down during the prosecution of grinding work. FIGS. 4(b) and 4(c) are a plan view and a left side view showing the shank 54 formed with the rake face 70 upon grinding work.

Further, a grinding direction, indicated by a whitened arrow in FIG. 4(a), and the centerline of the shank 54, shown in FIG. 4(b) as viewed on the plane, need not to be parallel to each other. The shank 54 may be inclined so as to intersect the grinding surface 82 at a given angle (ranging from, for instance, about 30° to 40°) depending on a degree of ease in grinding.

FIG. 5 is a series of views showing the diamond raw material 10 in a sole structure. In FIG. 5(a) showing a status before the diamond raw material 10 is subjected to grinding work, the first apex 13a is ground and removed in a slope inclined at the inclined angle θ with respect to the second bottom surface 12d as shown in FIG. 5(b). This allows the diamond raw material 10 to have the rake face 70 as shown in FIG. 5(c). The rake face 70 is formed in an isosceles triangle with two ridgelines of removed portions, indicated by broken lines in FIG. 5(b), which have dimensions "a" and "b" defined in the proportion of 1:1. The inclined angle θ forms an angle between the centerline of the isosceles triangle and the second bottom surface 12d. Thus, the rake face 70 is defined with a surface (herein referred to as a "surface {100}+θ") that is inclined from the surface {100} of the second bottom surface 12d to the surface {111} by the inclined angle θ.

With the present invention, the inclined angle θ is determined to fall in a range of 35°16'±5°, i.e., a value ranging from 30°16' to 40°16' and, in the illustrated embodiment, the inclined angle θ is determined in a range of 35°16'±1°. The surface {100}+35°16' nearly corresponds to the surface {112} and, in the illustrated embodiment, the rake face 70 is formed in a range of about {112}±1°. In order to form the rake face 70 in such a way, the inclined angle θ and the inclined angle α of the mount seat surface 64 are determined to fall in a range of 35°16'±1°.

Further, the surface {112} occurs when the ridgelines of the removed portions, indicated by the broken lines in FIG. 5(b), have dimensions "a", "b" and "c" in the proportion of 1:1:½ and the resultant inclined angle θ lies at a value of 35°16' (strictly saying, 35°15'52"). In order to have such a surface {112}, the dimensions "a" and "b" need to be equal to each other. However, such dimensions may deviate from each other within a range less than a value of ±10% or ±5%.

Here, if the inclined angle α=35°16', then, under a status as viewed in FIG. 3(b) on a plane perpendicular to the mount reference surface 56, an inclined angle, defined with the four ridgelines surrounding the first and second bottom surfaces 12a and 12d in a fore and aft direction (in a lateral direction in FIG. 3(b) on an inclined direction of the mount seat surface 64) of the shank, lies in a value of 50° 45'. The mount seat surface 64 may be provided so as to allow the diamond raw material 10 to be fixedly mounted on the shank 54 in an attitude to fall in a range of 50°45'±1° under such a condition described above.

As shown in FIG. 1, further, the diamond raw material 10 has a front distal end whose ridgeline 11a (see FIG. 3) ground and removed at a given inclined angle φ to form a front clearance face 72. The diamond raw material 10 has a pair of lateral clearance faces 74 and 76 on both sides of the front clearance face 72, so that a cutting edge 78 is formed in a portion intersecting the front clearance face 72 at a distal end of the rake face 70 along the inclining direction thereof. The inclined angle φ of the front clearance face 72 represents a clearance angle that increases on a negative (−) side. Suppose the rake face 70 has a rake angle a° and the front clearance face 72 has a clearance angle b°, the inclined angle φ is set to a negative side angle with the rake angle a° and the clearance angle b° being added to the inclined angle θ. For instance, the inclined angle φ is set to a value in the order of approximately −(θ+5°~10°). Due to the ridgeline 11a formed on the surface {110}, the front clearance face 72 is expressed as "{100}-φ" and nearly matches a surface {111} if φ≈35°16'.

Suppose the rake face 70 lies on the surface {112} with the rake angle a° laying at 0°, a surface paralleled to a direction in which a main component force acts on the cutting edge 78 is formed in the surface {111}. This results in excellent wear resistant performance especially against flank wear. This similarly applies to a case wherein the front clearance face 72 is made to be {100}-b° so as to obtain a given clearance angle b°. In addition, even if the surface paralleled to the direction in which the main component force acts does not completely match the surface {111}, a similar advantageous effect can be expected if such a surface lies in the vicinity (of, for instance, in the order of a range of approximately {111}±5°) of such a surface.

The pair of lateral clearance faces 74 and 76 have distal ends at which ridgelines of these faces nearly intersect each other to form the front clearance face 72. The cutting edge 78 is defined with an apex at which the rake face 70 intersects the pair of lateral clearance faces 74 and 76. Grinding the lateral clearance faces 74 and 76 while grinding a distal end portion of the shank 54 results in the formation of a pair of front slant surfaces 58. However, during the step of manufacturing the holder before the diamond raw material 10 is fixedly mounted, it becomes possible to prepare the shank 54 with the same shape as that shown in FIG. 1 or a shape in which the lateral clearance faces 74 and 76 protrude outward from the front slant surfaces 58. Thus, the step of grinding the rake face 70, the front clearance face 72 and the lateral clearance faces 74 and 76 corresponds to a claimed grinding step. Thus, the diamond cutting tool 50 is obtained with a structure having the synthetic diamond 52 formed in a given shape as shown in FIG. 1.

With the present embodiment, the mount reference surface 56 of the shank 54 has the mount seat 62 formed with the mount seat surface 64 inclined at the given inclined angle α, on which the first bottom surface 12a of the diamond raw material 10 is held in tight contact. Thus, the diamond raw material 10 is integrally mounted on the shank 54 in an attitude in which the four ridgelines surrounding the first bottom surface 12a are inclined at an angle of about 45° (within a range below ±1°) with respect to the inclining direction of the mount seat surface 64, that is, an attitude in which the first apex 13a protrudes forward nearly along the centerline of the shank 54.

By grinding the portion of the first apex 13a protruding from the mount seat surface 56 of the diamond raw material 10 at the given inclined angle θ, the surface {112} or its vicinity (within a range below approximately ±1°) is formed as the rake face 70. In such a case, the first bottom surface 12a of the diamond raw material 10 is held in tight contact with the mount seat surface 64 to be fixedly mounted thereon. Therefore, an increased contact surface area can be easily ensured, thereby easily obtaining high fixing strength even when bonded by brazing. This results in a remarkable reduction in manufacturing time and manufacturing cost, in comparison to a case wherein the second apex 13b is ground and removed in a portion opposite to the first apex 13a to be formed with the rake face 70.

Thus, with the surface {112} or its vicinity formed as the rake face 70 in combined effect of the surface {111} or its vicinity perpendicular to the surface {112} being formed as the front clearance 72, the diamond cutting tool 50 can be simply manufactured at low cost with a structure having excellent wear resistance.

With the present embodiment, further, the diamond raw material 10 is integrally bonded to the mount seat 62 of the shank 54 by active metal brazing. This easily ensures the shank 54 to have an increased bonding surface. Therefore, the diamond raw material 10 can be strongly bonded to the shank 54 with no need for troublesome grinding work to be performed. With the present embodiment, especially, the concaved mount seat 62 formed in the triangular pyramid shape has three surfaces with which the diamond raw material 10 is held in contact, increasing in a contact surface area. This enables the diamond raw material 10 to have further increased bonding strength. Therefore, the diamond raw material 10 can be mounted on the mount seat 62 with adequate bonding strength even if the mount surface 62 is relatively small in structure. Accordingly, the present invention can be appropriately applied to a case in which the mount seat 62 cannot be adequately ensured.

With the second apex 13b of the diamond raw material 10 fitted to the concaved mount seat 62 formed in the triangular pyramid shape, the diamond raw material 10 can be positioned in the stably fixed attitude with high precision. This allows the diamond raw material 10 to be stably retained in the fixed attitude with high precision. This enables the rake face 70 formed with the surface {112} or its vicinity to be ground with high precision.

Further, the mount seat surface 74 of the mount seat 62 has the inclined angle α equal to the inclined angle θ of the rake face 70. Thus, the step of grinding the portion of the first apex 13a protruding from the mount reference surface 56 can be sufficiently performed, with the shank 54 placed in parallel to the grinding surface 82 as shown in FIG. 4(a). Thus, the rake face 70 can be simply ground with high precision.

Figures 6, 7:
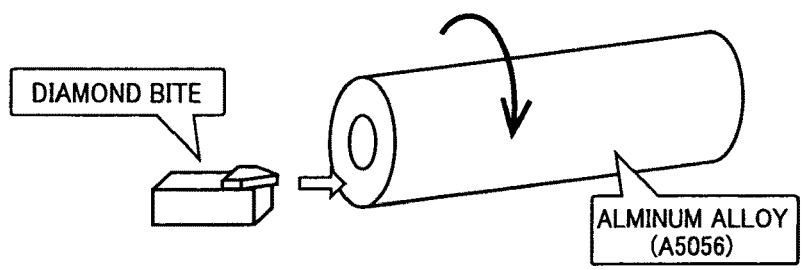
FIG. 6 is a schematic perspective view illustrating end face cutting work for checking tool life with the use of a product implementing the present invention and the other product of the conventional art.
FIG. 7 is a view showing test results on the product implementing the present invention and the other product of the conventional art in comparison to each other.

The diamond cutting tool 50 of the present embodiment and the diamond cutting tool of the related art were prepared and cut under a cutting condition described below. The diamond cutting tool (bite) 50 of the present embodiment had the inclined angle θ=36°16', the inclined angle α=−41°16' with the rake face 70 nearly matching the surface {112} and the clearance face 72 nearly matching the surface {111}−5°. In the diamond cutting tool (bite) of the conventional art shown in FIG. 10, the surface {100} of the diamond raw material 10 matches the raked surface 20, and the front clearance surface 22 matches the surface {100}−5°. During the execution of cutting work, an end face of aluminum alloy, drivably rotating about an axis as shown in FIG. 6 was cut by the tools, after which a cutting distance in initial wear was checked. As a result, it revealed consequences shown in FIG. 7.

(Cutting Condition)
Material to be cut: Aluminum Alloy (JIS-A5056)
Type of Cutting: End Face Cutting
Cutting Speed: 300 m/min
Feed (feed in a radial direction): 0.01 mm/rev As will be apparent from the result shown in FIG. 7, the product implementing the present invention can ensure cutting work to be performed in a cutting length greater than 50 km. This provides further remarkable improvement in tool life than that achieved with a product of the conventional art. Initial wear resulted in a state with given minimal wear occurred on the cutting edge 78 with a capability of performing mirror-like finishing. This differs from reground life that needs regrinding to be performed. However, the cutting length of the cutting tool until the occurrence of initial wear is nearly proportional to a cutting length until regrinding life is reached. Accordingly, by referring to the cutting length until the occurrence of initial wear, regrinding life and, in addition, tool life including continuous use obtained by regrinding can be compared and determined.

The present embodiment has been described above with reference to a case wherein the shank 54 has the mount reference surface 56 formed with the concaved mount seat 62 formed in the triangular pyramid shape, to which the diamond raw material 10 is bonded in production of the diamond cutting tool 50.

Figure 8:
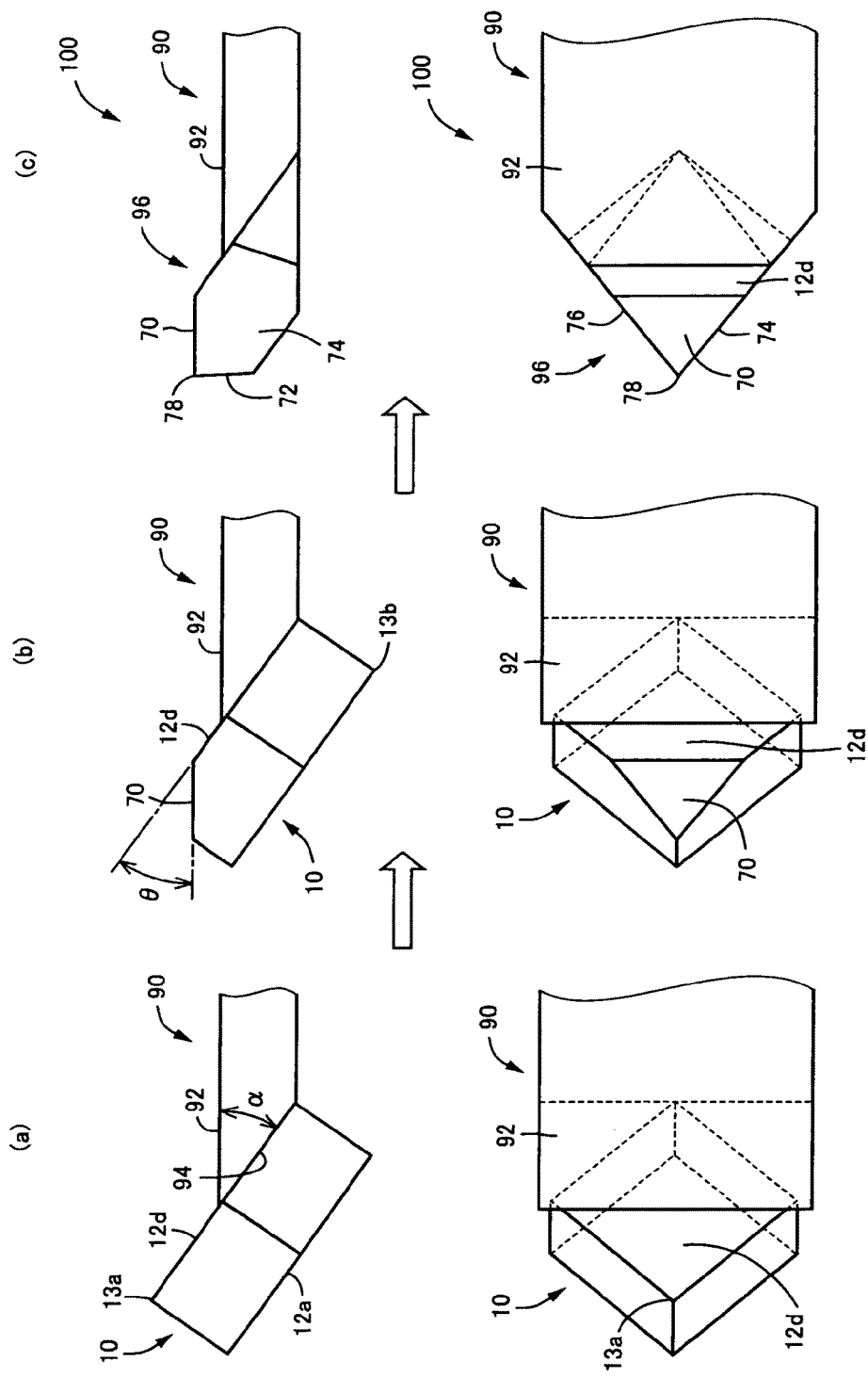
FIG. 8 is a series of views illustrating another embodiment according to the present invention.

However, the diamond raw material may be bonded to the shank in a manner shown in FIG. 8. That is, a rectangular solid shank 90 may have a distal end portion formed with a sloped surface 94 that is inclined downward at the inclined angle α with respect to a mount reference surface 92. Then, the second bottom surface 12d of the diamond raw material 10 is integrally bonded to the sloped surface 94 by active metal brazing (see FIG. 8(a)). Next, like the illustrated embodiment, the diamond raw material 10 is ground to form the raked face 70 at the inclined angle θ with respect to the second bottom surface 12d, the front clearance face 72 and the lateral clearance faces 74 and 76. Thus, a diamond cutting tool 100 can be manufactured in a structure with a synthetic diamond 96 formed in a given shape (see FIGS. 8(b) and 8(c)).

Further, a portion of the second apex 13b can be removed in nearly conformity to a bottom surface of the shank 90 depending on needs. Especially, since this removal can be performed with no requirement on precision, rough finishing may be simply conducted using a diamond grinding wheel or the like. However, the portion of the second apex 13b may be left intact unless otherwise no interference is particularly encountered.

With the present embodiment, the second bottom surface 12d integrally bonded to the sloped surface 94 in tight contact therewith, corresponds to a claimed first side face. FIG. 8(a) represents a step corresponding to a holder preparing and fixing step, and FIGS. 8(b) and 8(c) show steps corresponding to claimed grinding steps. Moreover, FIGS. 8(a) to 8(c) represent front views in upper areas, respectively, and plan views (representing views as viewed on a plane perpendicular to the rake face 70 and the mount reference surface 92) in lower areas.

While the present invention has been discussed above with reference to the illustrated embodiment shown in the drawings, it is to be construed that the embodiment described be considered only illustrative of the present invention. Various modifications and improvements could be developed in the light of knowledge of those skilled in the art.

INDUSTRIAL APPLICABILITY

With a method of manufacturing a diamond cutting member according to the present invention, a first side face of a diamond raw material is brought into tight contact with an inclined surface of a holder intact to be integrally mounted, upon which a portion around a first apex protruding from a mount reference surface is ground at a given inclined angle θ for removal. This allows the diamond raw material to have a surface {112} or its vicinity formed as a rake face, easily ensuring a surface area in contact with the holder while easily obtaining increased bonding strength. Thus, the method of manufacturing the diamond cutting member according to the present invention has further remarkable reductions in manufacturing time and manufacturing cost than those of a case wherein a portion around a second apex opposite to the first apex formed with the raked face is ground for removal to form a bonding surface.

With a surface {112} or its vicinity made in the rake face in combined effect of a surface {111} or its vicinity perpendicular to the surface {112} made in a front clearance face, the manufacturing method can be preferably adopted as a manufacturing method of a diamond cutting tool with excellent wear resistance. In addition, the diamond cutting tool obtained in such way, has superior performance in wear resistance and can be appropriately used in various cutting work.

The invention claimed is:

1. A diamond cutting member formed by a raw material made of a single crystal synthetic diamond having a hexahedral shape which basically has six surfaces and is formed with a cutting edge and a raked face, the diamond cutting member being integrally mounted on a given holder for use in performing cutting work, wherein
the holder has an inclined surface inclined at a given inclined angle α with respect to a mount reference surface;
the synthetic diamond is integrally mounted on the holder in an attitude such that a first side face forming one of the six surfaces of the synthetic diamond is located on the inclined surface in tight contact therewith, four ridgelines surrounding the first side face are inclined at a given angle ranging from 40° to 50° with respect to the inclined surface, and a first apex of one of eight apexes of the hexahedral shape is protruded from the mount reference surface along the inclining direction; and
the first apex of the synthetic diamond has a portion formed with the raked face inclined from the surface to a surface at a given inclined angle θ ranging from 35°16'-5° to 35°16'+5°, in an orientation toward the first apex along the inclining direction of the inclined surface, the distal end being formed with the cutting edge extending along an inclining direction of the raked face.

2. The diamond cutting member according to claim 1, wherein the synthetic diamond is integrally bonded to the inclined surface of the holder by active metal brazing.

3. The diamond cutting member according to claim 1, wherein the inclined angle α of the inclined surface formed on the holder is equal to the inclined angle θ of the raked face which is parallel to the mount reference surface of the holder.

4. The diamond cutting member according to claim 2, wherein the inclined angle α of the inclined surface formed on the holder is equal to the inclined angle θ of the raked face which is parallel to the mount reference surface of the holder.

5. The diamond cutting member according to claim 1, wherein
 the holder is a shank; and
 the diamond cutting member is a diamond cutting tool including the synthetic diamond integrally mounted on the shank at a distal end portion thereof.

\* \* \* \* \*